(12) United States Patent
Lai et al.

(10) Patent No.: US 11,314,683 B2
(45) Date of Patent: Apr. 26, 2022

(54) CIRCUITRY APPLIED TO ELECTRONIC DEVICE HAVING USB TYPE-C CONNECTOR AND ASSOCIATED ELECTRONIC DEVICE

(71) Applicant: Realtek Semiconductor Corp., HsinChu (TW)

(72) Inventors: Chao-Min Lai, HsinChu (TW); Ming-Tsung Tsai, HsinChu (TW); Yu-Jen Lin, HsinChu (TW); Shih-An Yang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/124,502

(22) Filed: Dec. 17, 2020

(65) Prior Publication Data
US 2021/0200709 A1    Jul. 1, 2021

(30) Foreign Application Priority Data

Dec. 30, 2019   (TW) ................................. 108148391

(51) Int. Cl.
*G06F 13/42*    (2006.01)
(52) U.S. Cl.
CPC .. *G06F 13/4282* (2013.01); *G06F 2213/0042* (2013.01)
(58) Field of Classification Search
CPC ...................... G06F 13/4282; G06F 2213/0042
See application file for complete search history.

(56) References Cited

U.S. PATENT DOCUMENTS

| | | | |
|---|---|---|---|
| 6,957,283 B2 * | 10/2005 | Dhir ....................... | H04L 29/06 710/72 |
| 10,152,447 B2 | 12/2018 | Lai | |
| 11,055,244 B1 * | 7/2021 | Langner .............. | G06F 13/4282 |
| 2014/0372661 A1 * | 12/2014 | Chandra ............. | G06F 13/4081 710/316 |
| 2015/0339250 A1 * | 11/2015 | Yu ....................... | G06F 13/4022 710/14 |

(Continued)

FOREIGN PATENT DOCUMENTS

| | | |
|---|---|---|
| TW | M335887 | 7/2008 |
| TW | I560551 B | 12/2016 |

OTHER PUBLICATIONS

Universal serial bus interfaces for data and power—Part 1-3: Common components—USB Type-CTM Cable and Connector Specification, International Standard, IEC 62680-1-3, Edition 3.0, May 2018, pp. 1-259, IEC, Geneva, Switzerland, XP082013853 ,May 2018.

*Primary Examiner* — Henry Tsai
*Assistant Examiner* — Harry Z Wang
(74) *Attorney, Agent, or Firm* — Winston Hsu

(57) ABSTRACT

A circuitry applied to an electronic device having a Universal Serial Bus (USB) type-C connector is provided. The circuitry includes a transceiver circuit, a physical layer circuit and a processing circuit. In operations of the circuitry, the transceiver circuit is coupled to the USB type-C connector. The physical layer circuit is configured to directly utilize a plurality of first signals from the USB type-C connector as at least one portion of Ethernet signals, and process the first signals to generate a plurality of processed first signals. The processing circuit is configured to process the processed first signals to generate an output signal.

14 Claims, 3 Drawing Sheets

(56) References Cited

U.S. PATENT DOCUMENTS

| | | | |
|---|---|---|---|
| 2016/0021430 A1* | 1/2016 | LaBosco | H04N 21/4367 725/31 |
| 2016/0253283 A1* | 9/2016 | Bowers | G06F 13/4068 710/305 |
| 2016/0378704 A1* | 12/2016 | Adamson | G06F 13/364 710/104 |
| 2017/0364465 A1 | 12/2017 | Tsukamoto | |
| 2018/0060270 A1 | 3/2018 | Schnell | |

* cited by examiner

| A1 | A2 | A3 | A4 | A5 | A6 | A7 | A8 | A9 | A10 | A11 | A12 |
|---|---|---|---|---|---|---|---|---|---|---|---|
| GND | SSTX1+ | SSTX1− | $V_{BUS}$ | CC1 | D+ | D− | SBU1 | $V_{BUS}$ | SSRX2− | SSRX2+ | GND |

| B12 | B11 | B10 | B9 | B8 | B7 | B6 | B5 | B4 | B3 | B2 | B1 |
|---|---|---|---|---|---|---|---|---|---|---|---|
| GND | SSRX1+ | SSRX1− | $V_{BUS}$ | SBU2 | D− | D+ | CC2 | $V_{BUS}$ | SSTX2− | SSTX2+ | GND |

FIG. 2

CIRCUITRY APPLIED TO ELECTRONIC DEVICE HAVING USB TYPE-C CONNECTOR AND ASSOCIATED ELECTRONIC DEVICE

BACKGROUND OF THE INVENTION

1. Field of the Invention

The present invention is related to electronic devices having Universal Serial Bus (USB) type-C connectors.

2. Description of the Prior Art

Gigabit Ethernet (1000M Ethernet) can provide fast and stable network connection. As the network connector is large, however, there are difficulties when designing an ultra-thin electronic device or set-top box. To solve this problem, some ultra-thin electronic devices may adopt an externally connected network card through a Universal Serial Bus (USB) cable. This method may require implementing a USB to Ethernet signal converting circuit in the network card, however, which increases the manufacturing costs.

SUMMARY OF THE INVENTION

Thus, an objective of the present invention is to provide a method of directly utilizing a Universal Serial Bus (USB) type-C connector for transmitting Ethernet signals, the method being applicable to an ultra-thin electronic device or set-top box without requiring implementing a USB to Ethernet signal converting circuit, to solve the problems of the related art.

In one embodiment of the present invention, a circuitry applied to an electronic device having a USB type-C connector is provided. The circuitry comprises a transceiver circuit, a physical layer circuit coupled to the transceiver circuit, and a processing circuit coupled to the physical layer circuit. In operations of the circuitry, the transceiver circuit is configured to connect to the USB type-C connector; the physical layer circuit is configured to directly utilize a plurality of first signals from the USB type-C connector as at least one portion of Ethernet signals, and process the first signals to generate a plurality of processed first signals; and the processing circuit is configured to process the processed first signals to generate an output signal.

In another embodiment of the present invention, an electronic device is provided. The electronic device comprises a USB type-C connector, a transceiver circuit, a physical layer circuit coupled to the transceiver circuit, and a processing circuit coupled to the physical layer circuit. In operations of the electronic device, the transceiver circuit is configured to connect to the USB type-C connector; the physical layer circuit is configured to directly utilize a plurality of first signals from the USB type-C connector as at least one portion of Ethernet signals, and process the first signals to generate a plurality of processed first signals; and the processing circuit is configured to process the processed first signals to generate an output signal.

In another embodiment of the present invention, an electronic device is provided. The electronic device comprises a network connector, a USB type-C connector, and a transceiver circuit coupled to the network connector and the USB type-C connector. In operations of the electronic device, the transceiver circuit is configured to directly transmit Ethernet signals from the network connector to a first electronic device through the USB type-C connector; or the transceiver circuit is configured to directly transmit a plurality of signals from the USB type-C connector to a second electronic device through the network connector.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a USB type-C connector.

DETAILED DESCRIPTION

Figure 1:
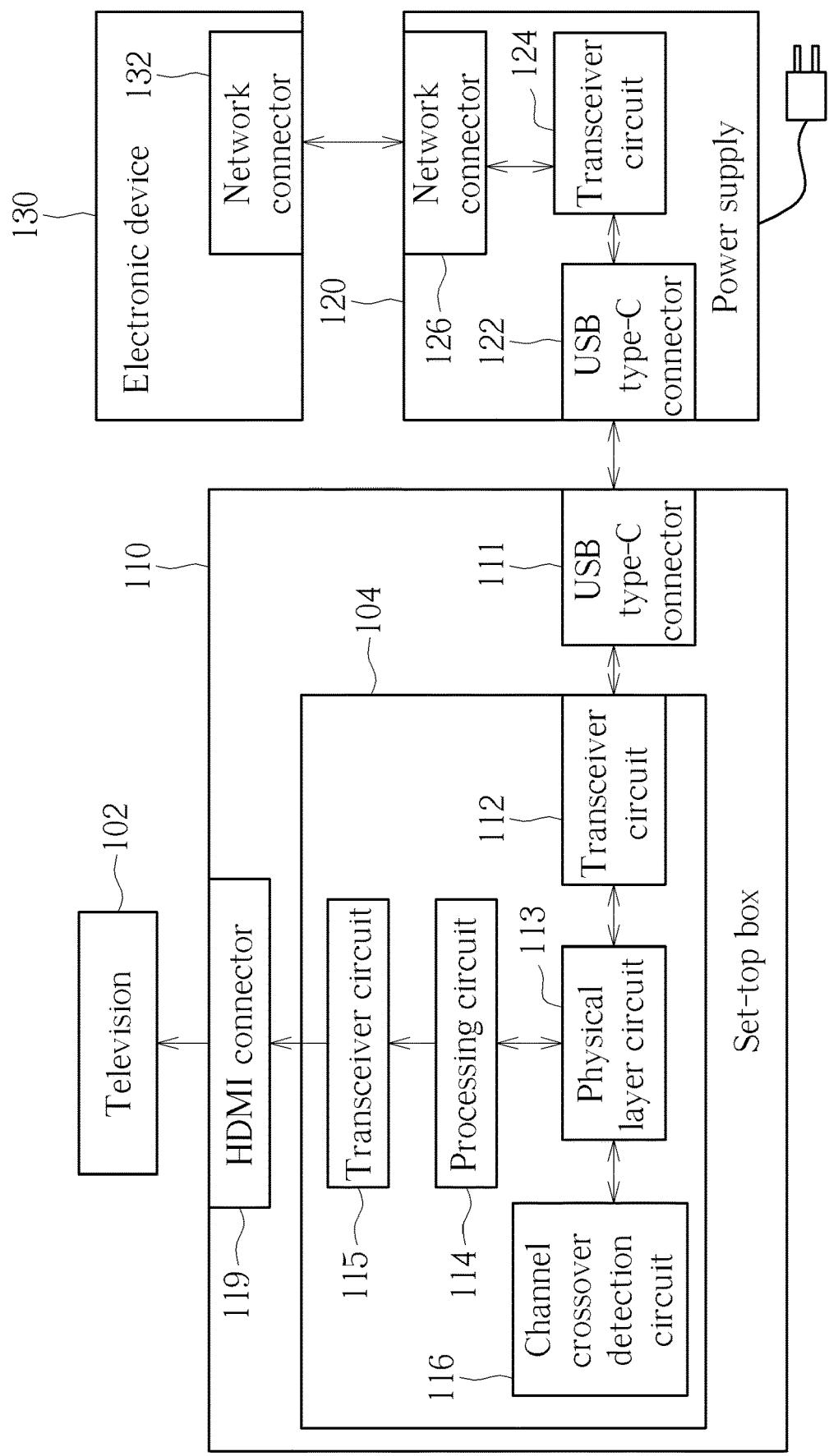
FIG. 1 is a diagram illustrating a system according to an embodiment of the present invention.

FIG. 1 is a diagram illustrating a system according to an embodiment of the present invention. As shown in FIG. 1, the system comprises a television 102, a set-top box 110, a power supply 120 and an electronic device 130. The set-top box 110 comprises a Universal Serial Bus (USB) type-C connector 111, a circuitry 104 and a High Definition Multimedia Interface (HDMI) connector 119. The circuitry 104 comprises a transceiver circuit 112, a physical layer circuit 113 coupled to the transceiver circuit 112, a processing circuit 114 coupled to the physical layer circuit 113, a transceiver circuit 115 and a channel crossover detection circuit 116. The power supply 120 comprises a USB type-C connector 122, a transceiver circuit 124 and a network connector 126. The electronic device 130 comprises a network connector 132 and associated processing circuits (not shown). In this embodiment, the electronic device 130 may be a router, a switch, a hub, or any other electronic device capable of connecting network signals and having network connector(s). In addition, the network connector 126 and 132 may be (but are not limited to) network connectors conforming to an 8 position 8 contact (8P8C) specification, e.g. an RJ45 connector. In another embodiment, the set-top box 110 may be a server dongle or a digital video converting box, which is configured to be connected to the television 102.

In operations of the system shown in FIG. 1, the network connector 126 of the power supply 120 utilizes a network cable for connecting to the network connector 132 of the electronic device 130, in order to transmit and receive Ethernet signals. The USB type-C connector 122 of the power supply 120 utilizes a USB type-C cable for connecting to the USB type-C connector 111 of the set-top box 110, in order to transmit and receive the Ethernet signals and USB signals. In addition, the power supply 120 may be connected to a mains voltage, and generate a supply voltage to be transmitted to the set-top box 110 through the USB type-C connector 122 for usage thereof. In particular, when the set-top box 110 needs to receive video data from outside and transmit it to the television 102 for playback, the transceiver circuit 124 receives Ethernet signals from the electronic device 130 through the network connector 126, directly transmits the received Ethernet signals through the USB type-C connector 122 (i.e. without converting the USB type-C format), and then transmits the Ethernet signals to the set-top box through the USB type-C connector 122. The physical layer circuit 113 of the set-top box 110 then receives the Ethernet signals through the transceiver circuit 112. After the physical layer circuit 113 performs physical layer related processing on the Ethernet signals, the processing circuit 114 further performs operations of decoding and format conversion, and generates an output signal conforming to HDMI specification. The transceiver circuit 115 then transmits the output signal to the television for playback through the HDMI connector 119.

Similarly, when the set-top box needs to transmits messages to an external server, the processing circuit 114 and the physical layer circuit 113 may directly generate the Ethernet signals, and transmit the Ethernet signals to the power supply 120 through the USB type-C connector 111. Then, the transceiver circuit 124 receives the Ethernet signals from the set-top box 110 through the USB type-C connector 122, directly transmits the received Ethernet signals to the network connector (i.e. without performing signal format conversion), and then transfers the Ethernet signals to the external server after transmitting the Ethernet signals to the electronic device 130 through the network connector 126.

As mentioned above, since the set-top box 110 may transmit/receive the Ethernet signals through the USB type-C connector 111, the set-top box 110 may simplify the design complexity without implementing large size connector(s). In addition, as the power supply 120 may directly transmit/receive Ethernet data through the USB type-C connector 122, there is no need for implementing any USB to Ethernet signal converting circuit therein, so the manufacturing costs will not be increased.

More specifically, refer to FIG. 2 which illustrates the USB type-C connectors 111/122, which comprise pins having numbers A1 to A12 and B1 to B12. The pins having the numbers A1 to A12 are referred to as GND, SSTX1+, SSTX1−, VBUS, CC1, D+, D−, SBU1, VBUS, SSRX2−, SSRX2+ and GND, respectively, and the pins having the numbers B1 to B12 are referred to as GND, SSTX2+, SSTX2−, VBUS, CC2, D+, D−, SBU2, VBUS, SSRX1−, SSRX1+ and GND, respectively. As those skilled in the art can understand the basic architecture of a USB type-C connector, related details are omitted here for brevity. In this embodiment, the USB type-C connector 111 may transmit and receive the Ethernet signals through the pins having the numbers A2, A3, B2 and B3. As the USB type-C cable may internally connect a transmitting signal line of one terminal to a receiving signal line of another terminal, the USB type-C connector 122 may receive and transmit the Ethernet signal through the pins having the numbers A10, A11, B10 and B11 at this time; or, the USB type-C connector 111 may transmit or receive the Ethernet signal through the pins having the numbers A10, A11, B10 and B11, and the USB type-C connector 122 may transmit and receive the Ethernet signals through the pins having the numbers A2, A3, B2 and B3 at this time; or, the USB type-C connector 111 may transmit and receive the Ethernet signals through the pins having the numbers A2, A3, B2, B3, A10, A11, B10 and B11, and the USB type-C connector 122 may also receive and transmit the Ethernet signals through the pins having the numbers A2, A3, B2, B3, A10, A11, B10 and B11 at this time.

Figure 3:
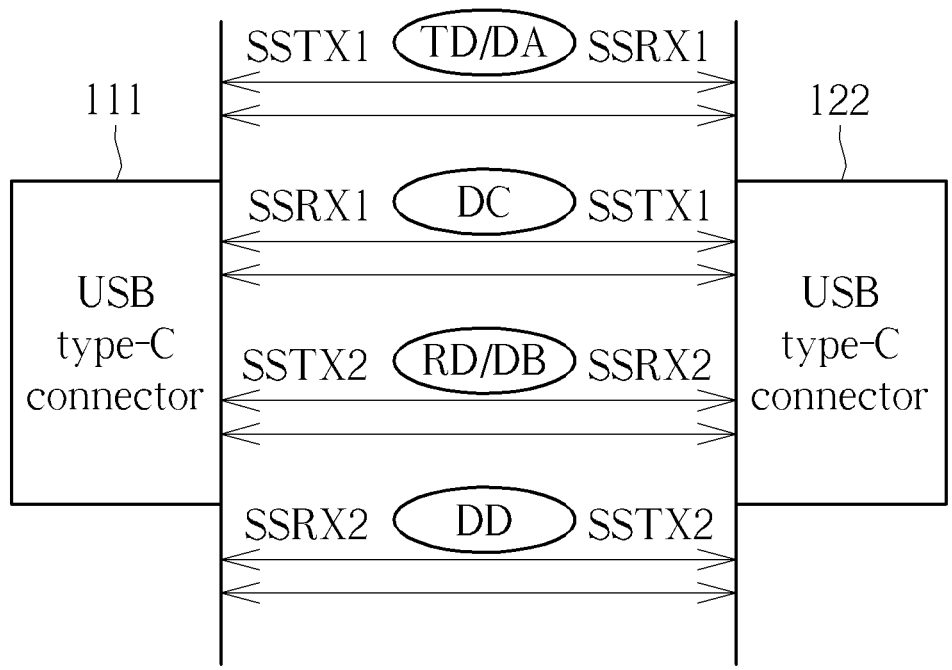
FIG. 3 is a diagram illustrating operations of utilizing a USB type-C connector to transmit Ethernet signals according to an embodiment of the present invention.

Refer to FIG. 3. Assuming that the set-top box 110 receives fast Ethernet (10/100M Ethernet) signals from the power supply 120 through the USB type-C connector 111, the physical layer circuit 113 directly utilizes a plurality of first signals from the pins having the numbers A2, A3, B2 and B3 within the USB type-C connector 111 (i.e. the pins corresponding to SSTX1+, SSTX1−, SSTX2+ and SSTX2− of the USB type-C specification) as the fast Ethernet signals. For example, two first signals corresponding to the pins having the numbers A2 and A3 within the USB type-C connector 111 (i.e. the pins corresponding to SSTX1+ and SSTX1− of the USB type-C specification) and the pins having the numbers B11 and B10 within the USB type-C connector 122 (i.e. the pins corresponding to SSRX1+ and SSRX1− of the USB type-C specification) are connected through a cable corresponding to a first channel (e.g. corresponding to the first and second pins having a signal named TD within the network connector), and two first signals corresponding to the pins having the numbers B2 and B3 within the USB type-C connector 111 (i.e. the pins corresponding to SSTX2+ and SSTX2− of the USB type-C specification) and the pins having the numbers A11 and A10 within the USB type-C connector 122 (i.e. the pins corresponding to SSRX2+ and SSRX2− of the USB type-C specification) are connected through a cable corresponding to a second channel (e.g. corresponding to the third and sixth pins having a signal name RD within the network connector). It should be noted that the pin connection relationship of the USB type-C connector 111 and the USB type-C connector 122 shown in FIG. 3 is illustrated under a condition where the USB type-C connector 122 is obversely connected/inserted; under a condition where the USB type-C connector 122 is reversely connected/inserted, SSTX1 may be connected to SSRX2 and SSTX2 may be connected to SSRX1.

Assuming that the set-top box 110 receives Gigabit Ethernet (1000M Ethernet) signals or ten Gigabit Ethernet signals from the power supply 120 through the USB type-C connector 111, the physical layer circuit 113 directly utilizes a plurality of first signals corresponding to the pins having the numbers A2, A3, B2 and B3 within the USB type-C connector 111 (i.e. signals SSTX1+, SSTX1−, SSTX2+ and SSTX2− corresponding to the USB type-C specification) and the pins having the numbers B11, B10, A11 and A10 within the USB type-C connector 122 (i.e. signals SSRX1+, SSRX1−, SSRX2+ and SSRX2− corresponding to the USB type-C specification) connected through a cable, and a plurality of second signals corresponding to the pins having the numbers A10, A11, B10 and B11 within the USB type-C connector 111 (i.e. signals SSRX2−, SSRX2+, SSRX1− and SSRX1+ corresponding to the USB type-C specification) and the pins having the numbers B3, B2, A3 and A2 within the USB type-C connector 122 (i.e. signals SSTX2−, SSTX2+, SSTX1− and SSTX1+ corresponding to the USB type-C specification) connected through a cable, as the Gigabit Ethernet signals or the ten Gigabit Ethernet signals. For example, two first signals of the pins having the numbers A2 and A3 within the USB type-C connector 111 correspond to a first channel (e.g. correspond to the first and second pins having a signal name DA within the network connector), two first signals of the pins having the numbers B2 and B3 within the USB type-C connector 111 correspond to a second channel (e.g. correspond to the third and sixth pins having a signal name DB within the network connector), two second signals of the pins having the numbers B10 and B11 within the USB type-C connector 111 correspond to a third channel (e.g. correspond to the fourth and fifth pins having a signal name DC within the network connector), and two second signals of the pins having the numbers A10 and A11 within the USB type-C connector 111 correspond to a fourth channel (e.g. correspond to the seventh and eighth pins having a signal name DD within the network connector).

In one embodiment, the pin connection relationships of the USB type-C connector 111 and the USB type-C connector 122 shown in FIG. 3 may be exchanged. That is, the present invention can also normally operate when the USB type-C connector 111 and the USB type-C connector 122 shown in FIG. 3 are exchanged, and these alternative designs also belong to the scope of the present invention.

It should be noted that the aforementioned correspondence relationship between multiple sets of pins within the USB type-C connector 111 and multiple channels (i.e. the first channel to the fourth channel) of the Ethernet signals is for illustrative purposes only, and is not a limitation of the present invention.

As the USB type-C connector 111 supports both obverse connection and reverse connection, the channel crossover detection circuit 116 within the set-top box 110 can detect whether channels of the Ethernet signals have a crossover effect and accordingly generate a detection result for being used by the physical layer circuit 113. In this embodiment, the channel crossover detection circuit 116 may adopt a technique of the related art, which utilizes an electronic device to detect whether network lines are straight forward lines or crossover lines, i.e. automatic crossover detection technique, and related detail is therefore omitted for brevity.

Figure 4:
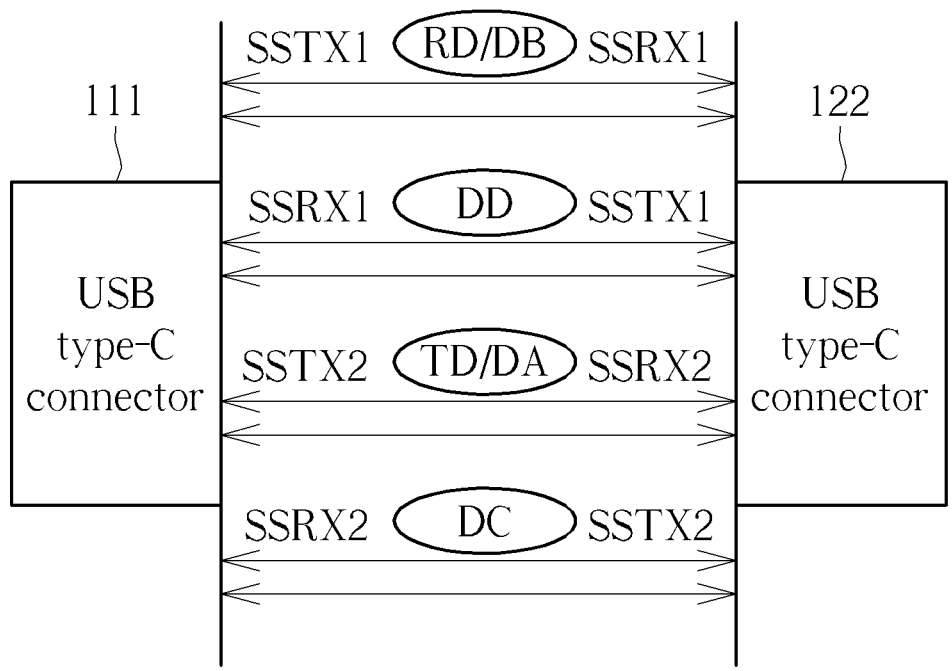
FIG. 4 is a diagram illustrating operations of utilizing a USB type-C connector to transmit Ethernet signals according to another embodiment of the present invention.

In this embodiment, if the channel crossover detection circuit 116 detects that the channels of the Ethernet signals do not have the crossover effect, the physical layer circuit 113 may determine which pins the USB type-C connector 111 utilizes to receive the first to fourth channels of the Ethernet signals as shown in FIG. 3; and if the channel crossover detection circuit 116 detects that the channels of the Ethernet signals have the crossover effect, the physical layer circuit 113 may determine which pins the USB type-C connector 111 utilizes to receive the first to fourth channels of the Ethernet signals as shown in FIG. 4. That is, when the detection result indicates that the channels of the Ethernet signals do not have the crossover effect, the physical layer circuit 113 controls the pins having the numbers A2 and A3 within the USB type-C connector to correspond to the first channel of the Ethernet signals, controls the pins having the numbers B2 and B3 within the USB type-C connector to correspond to the second channel of the Ethernet signals, controls the pins having the numbers B10 and B11 within the USB type-C connector to correspond to the third channel of the Ethernet signals, and controls the pins having the numbers A10 and A11 within the USB type-C connector to correspond to the fourth channel of the Ethernet signals; and when the detection result indicates that the channels of the Ethernet signals have the crossover effect, the physical layer circuit 113 controls the pins having the numbers B2 and B3 within the USB type-C connector to correspond to the first channel of the Ethernet signals, controls the pins having the numbers A2 and A3 within the USB type-C connector to correspond to the second channel of the Ethernet signals, controls the pins having the numbers A10 and A11 within the USB type-C connector to correspond to the third channel of the Ethernet signals, and controls the pins having the numbers B10 and B11 within the USB type-C connector to correspond to the fourth channel of the Ethernet signals.

It should be noted that the embodiment of FIG. 1 takes the set-top box 110 and the power supply 120 as an example, but the present invention is not limited thereto. In other embodiments, the set-top box 110 and/or the power supply 120 may be replaced with electronic devices having different functions. As long as two electronic devices can transmit/receive Ethernet signals through the USB type-C connector, related alternative designs also belong to the scope of the present invention.

Briefly summarized, the circuitry applied to an electronic device having a USB type-C connector and the associated electronic device transmit/receive Ethernet signals through the USB type-C connector without requiring an additional USB to Ethernet signal converting circuit. The circuitry is suitable for ultra-thin or tiny electronic devices without increasing additional manufacturing costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuitry applied to an electronic device having a Universal Serial Bus (USB) type-C connector, comprising:
   a transceiver circuit, coupled to the USB type-C connector;
   a physical layer circuit, coupled to the transceiver circuit, configured to directly utilize a plurality of first signals from the USB type-C connector as at least one portion of Ethernet signals, and process the first signals to generate a plurality of processed first signals;
   a processing circuit, coupled to the physical layer circuit, configured to process the processed first signals to generate an output signal; and
   a channel crossover detection circuit, configured to detect whether channels of the Ethernet signals have a crossover effect, and accordingly generate a detection result;
   wherein when the detection result indicates that the channels of the Ethernet signals do not have the crossover effect, the physical layer circuit controls pins having numbers A2 and A3 within the USB type-C connector to correspond to a first channel of the Ethernet signals, controls pins having numbers B2 and B3 within the USB type-C connector to correspond to a second channel of the Ethernet signals, controls pins having numbers B10 and B11 within the USB type-C connector to correspond to a third channel of the Ethernet signals, and controls pins having numbers A10 and A11 within the USB type-C connector to correspond to a fourth channel of the Ethernet signals; and when the detection result indicates that the channels of the Ethernet signals have the crossover effect, the physical layer circuit controls the pins having the numbers B2 and B3 within the USB type-C connector to correspond to the first channel of the Ethernet signals, controls the pins having the numbers A2 and A3 within the USB type-C connector to correspond to the second channel of the Ethernet signals, controls the pins having the numbers A10 and A11 within the USB type-C connector to correspond to the third channel of the Ethernet signals, and controls the pins having the numbers B10 and B11 within the USB type-C connector to correspond to the fourth channel of the Ethernet signals.

2. The circuitry of claim 1, wherein the physical layer circuit directly utilizes the first signals from the pins having the numbers A2, A3, B2 and B3 within the USB type-C connector or from the pins having the numbers A10, A11, B10 and B11 within the USB type-C connector as the at least one portion of the Ethernet signals.

3. The circuitry of claim 2, wherein the physical layer circuit directly utilizes the first signals as fast Ethernet (10/100M Ethernet) signals.

4. The circuitry of claim 2, wherein if the physical layer circuit directly utilizes the signals from the pins having the numbers A2, A3, B2 and B3 within the USB type-C connector as the at least one portion of the Ethernet signals, the physical layer circuit further directly utilizes a plurality of second signals from the pins having the numbers A10, A11, B10 and B11 within the USB type-C connector as another portion of the Ethernet signals, and process the second signals to generate a plurality of processed second signals; and the processing circuit processes the processed first signals and the processed second signals to generate the output signal.

5. The circuitry of claim 4, wherein the physical layer circuit directly utilizes the first signals and the second signals as Gigabit Ethernet (1000M Ethernet) signals or ten Gigabit Ethernet signals.

6. The circuitry of claim 1, wherein the electronic device is a set-top box, and the output signal conforms to a High Definition Multimedia Interface (HDMI).

7. The circuitry of claim 1, wherein the transceiver circuit receives the Ethernet signals and a supply voltage from a power supply through the USB type-C connector.

8. An electronic device, comprising:
a Universal Serial Bus (USB) type-C connector;
a transceiver circuit, coupled to the USB type-C connector;
a physical layer circuit, coupled to the transceiver circuit, configured to directly utilize a plurality of first signals from the USB type-C connector as at least one portion of Ethernet signals, and process the first signals to generate a plurality of processed first signals;
a processing circuit, coupled to the physical layer circuit, configured to process the processed first signals to generate an output signal; and
a channel crossover detection circuit, configured to detect whether channels of the Ethernet signals have a crossover effect, and accordingly generate a detection result;
wherein when the detection result indicates that the channels of the Ethernet signals do not have the crossover effect, the physical layer circuit controls pins having numbers A2 and A3 within the USB type-C connector to correspond to a first channel of the Ethernet signals, controls pins having numbers B2 and B3 within the USB type-C connector to correspond to a second channel of the Ethernet signals, controls pins having numbers B10 and B11 within the USB type-C connector to correspond to a third channel of the Ethernet signals, and controls pins having numbers A10 and A11 within the USB type-C connector to correspond to a fourth channel of the Ethernet signals; and when the detection result indicates that the channels of the Ethernet signals have the crossover effect, the physical layer circuit controls the pins having the numbers B2 and B3 within the USB type-C connector to correspond to the first channel of the Ethernet signals, controls the pins having the numbers A2 and A3 within the USB type-C connector to correspond to the second channel of the Ethernet signals, controls the pins having the numbers A10 and A11 within the USB type-C connector to correspond to the third channel of the Ethernet signals, and controls the pins having the numbers B10 and B11 within the USB type-C connector to correspond to the fourth channel of the Ethernet signals.

9. The electronic device of claim 8, wherein the physical layer circuit directly utilizes the first signals from the pins having the numbers A2, A3, B2 and B3 within the USB type-C connector or from the pins having the numbers A10, A11, B10 and B11 within the USB type-C connector as the at least one portion of the Ethernet signals.

10. The electronic device of claim 9, wherein the physical layer circuit directly utilizes the first signals as fast Ethernet (10/100M Ethernet) signals.

11. The electronic device of claim 9, wherein if the physical layer circuit directly utilizes the signals from the pins having the numbers A2, A3, B2 and B3 within the USB type-C connector as the at least one portion of the Ethernet signals, the physical layer circuit further directly utilizes a plurality of second signals from the pins having the numbers A10, A11, B10 and B11 within the USB type-C connector as another portion of the Ethernet signals, and processes the second signals to generate a plurality of processed second signals; and the processing circuit processes the processed first signals and the processed second signals to generate the output signal.

12. The electronic device of claim 11, wherein the physical layer circuit directly utilizes the first signals and the second signals as Gigabit Ethernet (1000M Ethernet) signals or ten Gigabit Ethernet signals.

13. The electronic device of claim 8, wherein the electronic device is a set-top box, and the electronic device further comprises:
a High Definition Multimedia Interface (HDMI) connector, configured to transmit the output signal to a television.

14. The electronic device of claim 8, wherein the transceiver circuit receives the Ethernet signals and a supply voltage from a power supply through the USB type-C connector.

* * * * *